(12) United States Patent
Edwards (10) Patent No.: US 9,211,935 B2
(45) Date of Patent: Dec. 15, 2015

(54) BICYCLE BRAKE ASSEMBLY

(71) Applicant: Craig Hawley Edwards, La Canada, CA (US)

(72) Inventor: Craig Hawley Edwards, La Canada, CA (US)

( * ) Notice: Subject to any disclaimer, the term of this patent is extended or adjusted under 35 U.S.C. 154(b) by 157 days.

(21) Appl. No.: 14/194,632

(22) Filed: Feb. 28, 2014

(65) Prior Publication Data

US 2014/0345981 A1    Nov. 27, 2014

Related U.S. Application Data

(60) Provisional application No. 61/826,532, filed on May 23, 2013.

(51) Int. Cl.
*B62L 1/02* (2006.01)
*B62L 1/16* (2006.01)

(52) U.S. Cl.
CPC ........................................ *B62L 1/16* (2013.01)

(58) Field of Classification Search
CPC ............... B62L 1/16; B62L 1/14; B62L 1/10; B62L 1/06; B62L 1/02
See application file for complete search history.

(56) References Cited

U.S. PATENT DOCUMENTS

| | | |
|---|---|---|
| 8,096,392 B2 | 1/2012 | Edwards |
| 8,297,415 B2 | 10/2012 | Edwards |
| 8,590,423 B2 | 11/2013 | Edwards |
| 2009/0078512 A1* | 3/2009 | Edwards .................. B62L 1/16 188/24.12 |
| 2013/0025979 A1* | 1/2013 | Wehage .................... B62L 1/16 188/24.12 |

* cited by examiner

*Primary Examiner* — Nicholas J Lane
(74) *Attorney, Agent, or Firm* — David O. Simmons (57) ABSTRACT

A bicycle brake assembly comprises brake arms, axles, a force application linkage structure, and a movement control linkage member. The brake arms are each pivotably mounted at the central portion thereof on a respective one of the axles. The force application linkage structure has a first force transmitting member connected to the first brake arm and a second force transmitting member thereof connected to the second brake arm. The movement control linkage member is coupled between the first one of the force transmitting members of the force application linkage structure and the second one of the axles for controlling movement the brake arms relative to each other for a given displacement of the force application linkage structure.

20 Claims, 4 Drawing Sheets

BICYCLE BRAKE ASSEMBLY

This United States non-provisional patent application claims priority from U.S. provisional patent application Ser. No. 61/826,532 filed May 23, 2013 entitled "Bicycle Brake Assembly", which has a common applicant herewith and is being incorporated herein in its entirety by reference.

FIELD OF THE DISCLOSURE

The invention described herein relates to bicycle brake assemblies and, in particular, to cable actuated assemblies which act upon the rim of a bicycle wheel

BACKGROUND

Bicycling is an increasingly popular form of recreation and a means of transportation and has become a popular competitive sport for both amateurs and professionals. Whether a bicycle is designed for use in recreation, transportation or competition, making of improvements to the various components of bicycles designed for these activities continues to be a focus of many in this field.

One component of bicycles that has been extensively redesigned is the bicycle brake assembly. Consequently, there are many different designs, configurations and elements of bicycle brake assemblies known in the art. For example, in recent years, braking systems have been designed for use with bicycles that include braking discs mounted to one of the wheels of the bicycle in combination with actuated brake caliper assemblies (see, e.g. U.S. Pat. No. 7,261,188). Such brake caliper assemblies typically include elements such as hydraulically operated pistons that can, for example, engage a pair of braking pads that in turn selectively contact a braking disc.

Other illustrative bicycle brake assemblies that are known in the art include for example, those described in U.S. Pat. No. 4,718,521, which discloses a bicycle caliper brake assembly having a first caliper having a connecting portion provided with a boss rotatably and axially movably receiving a rotary member. Similarly, U.S. Pat. No. 6,125,973 discloses a brake pad holder designed for adjustably mounting a bicycle brake pad to a brake caliper arm. In this assembly, the brake pad holder is designed to maintain the mounting arm thereof in an orthogonal orientation with respect to the brake caliper arm, while the brake pad holder is adjustable. U.S. Pat. No. 6,264,008 discloses a parallel-push brake assembly for bicycles that provides substantially translational motion of the brake pad using a mechanism that is relatively free of tolerance build-up or slop. U.S. Pat. No. 6,607,056 discloses a brake apparatus for a bicycle capable of applying a higher braking force on the front wheel and a lower braking force on the rear wheel given the same force exerted on the levers controlling the front brake and the rear brake so to prevent early locking of the rear wheel of the bicycle during braking while leaving the cyclist the possibility to separately control the front brake and the rear brake. U.S. Pat. No. 7,353,918 discloses a brake assembly for a bicycle composed of an arrangement of a pair of brake pads each connected to a rod member in turn guided for axial movement by a base fixed on the bicycle frame.

While a variety of bicycle brake assemblies are known in the art, there exists a need for an improved brake assemblies, ones that for example allow for an optimized distribution of the forces associated with the operation of the assembly as well as ones that are easier to use and/or adjust than existing brake assemblies. Embodiments of the invention disclosed herein address this need in the art as well as other needs, which will become apparent from the following disclosure.

SUMMARY OF THE DISCLOSURE

The bicycle brake assembly disclosed herein has a number of embodiments, for example, those that are illustrated in the drawings. Moreover, those of skill in the art will understand that numerous changes can be implemented to the construction and forms of the various elements used in the illustrative embodiments disclosed herein yet remain within the context of the concepts characterizing the embodiments of this invention. As demonstrated by the illustrative embodiments disclosed below and those shown in the drawings, such embodiments of the bicycle brake assembly are specifically directed to a bicycle brake assembly having a first brake arm and a second brake arm that are mounted directly on a structural element of a bicycle frameset (e.g., a first set of brake arms pivotably mounted directly on a frame portion of the bicycle frameset and a second set of brake arms pivotably mounted directly on a fork portion of the bicycle frameset). This is in contrast to the brake arms being pivotably mounted on a bridge structure and the bridge structure being mounted on the structural element of the bicycle frameset.

In one embodiment, a bicycle brake assembly comprises a first brake arm, a second brake arm, a plurality of axles, brake arm displacement means, and a movement control linkage member. The first brake arm has a first end portion, a second end portion, and a central portion between the end portions thereof. The second brake arm has a first end portion, a second end portion, and a central portion between the end portions thereof. The first brake arm is pivotably mounted at the central portion thereof on a first one of the axles. The second brake arm is pivotably mounted at the central portion thereof on a second one of the axles. The brake arm displacement means has a first force transmitting member thereof connected to the first end portion of the first brake arm and a second force transmitting member thereof connected to the first end portion of the second brake arm. A first actuation mode of the brake arm displacement means causes each one of the brake arms to pivot with respect to a respective one of the axles on which each one of the brake arms is pivotably mounted such that a distance between the first end portion of the brake arms increases. A second actuation mode of the brake arm displacement means causes the brake arms to pivot with respect to a respective one of the axles on which each one of the brake arms is pivotably mounted such that a distance between the first end portions of the brake arms decreases. The movement control linkage member is coupled between the first one of the force transmitting members of the brake arm displacement means and the second one of the axles for controlling movement the brake arms relative to each other for a given displacement of the brake arm displacement means.

In another embodiment, a bicycle brake assembly comprises a first brake arm, a second brake arm, a plurality of axles, a force application linkage structure, and a movement control linkage member. The first brake arm has a first end portion, a second end portion, and a central portion between the end portions thereof. The second brake arm has a first end portion, a second end portion, and a central portion between the end portions thereof. The first brake arm is pivotably mounted at the central portion thereof on a first one of the axles. The second brake arm is pivotably mounted at the central portion thereof on a second one of the axles. The force application linkage structure has a first force transmitting member thereof connected to the first end portion of the first brake arm and a second force transmitting member thereof connected to the first end portion of the second brake arm. Displacement of a force application portion of the force application linkage structure in a first displacement direction thereof causes the brake arms to pivot with respect to a respective one of the axles on which each one of the brake arms is pivotably mounted such that a distance between the first end portion of the brake arms increases and displacement of the force application portion in a second displacement direction thereof causes the brake arms to pivot with respect to a respective one of the axles on which each one of the brake arms is pivotably mounted such that a distance between the first end portion of the brake arms decreases. The movement control linkage member is coupled between the first one of the force transmitting members of the force application linkage structure and the second one of the axles for controlling movement the brake arms relative to each other for a given displacement of the force application linkage structure.

In another embodiment, a bicycle brake assembly comprises a first brake arm, a second brake arm, an axle assembly, a force application linkage structure, and a movement control linkage member. The first brake arm has a first end portion, a second end portion, and a central portion between the end portions thereof. The second brake arm has a first end portion, a second end portion, and a central portion between the end portions thereof. The axle assembly includes a plurality of axles and a bridge plate coupled between a first end portion of each one of the axles. The first brake arm is pivotably mounted at the central portion thereof on a first one of the axles. The second brake arm is pivotably mounted at the central portion thereof on a second one of the axles. The force application linkage structure has a first force transmitting member thereof connected to the first end portion of the first brake arm and a second force transmitting member thereof connected to the first end portion of the second brake arm. Displacement of a force application portion of the force application linkage structure in a first displacement direction thereof causes the brake arms to pivot with respect to a respective one of the axles on which each one of the brake arms is pivotably mounted such that a distance between the first end portion of the brake arms increases. Displacement of the force application portion in a second displacement direction thereof causes the brake arms to pivot with respect to a respective one of the axles on which each one of the brake arms is pivotably mounted such that a distance between the first end portion of the brake arms decreases. The movement control linkage member is coupled between the first force transmitting member of the force application linkage structure and the axle assembly for controlling movement the brake arms relative to each other for a given displacement of the force application linkage structure.

These and other objects, embodiments, advantages and/or distinctions of the present invention will become readily apparent upon further review of the following specification, associated drawings and appended claims.

DETAILED DESCRIPTION OF THE DRAWING FIGURES

FIGS. 1-4 show a brake caliper assembly 100 configured in accordance with an embodiment of the present invention. The brake caliper assembly 100 includes a first brake arm 102, a second brake arm 104, a first brake arm mounting axle 106, a second brake arm mounting axle 108, a force application linkage structure 110, and a movement control linkage member 114. The first arm mounting axle 106 and the second arm mounting axle 108 are each attached at a first end portion thereof to a brake arm support structure 116 of a bicycle frameset through a respective mounting stud 117 (best shown in FIGS. 2, 5 and 6). For example, a typical bicycle frameset includes a frame and a fork rotatably mounted on the frame. Thus, a frame of the frameset can have a brake arm support structure integral therewith (i.e., a rear wheel a brake arm support structure) and a fork of the frameset can have a brake arm support structure integral therewith (i.e., a front wheel a brake arm support structure). A first end portion of each mounting stud 117 is engaged within (e.g., via threaded engagement) the brake arm support structure 116 and a second end portion of each mounting stud 117 is engaged within (e.g., via threaded engagement) with a respective one of the brake arm mounting axles 108, 109.

The first brake arm 102 is pivotably mounted at a central portion 118 thereof on the first brake arm mounting axle 106, as shown in FIGS. 1-5. The second brake arm 104 is pivotably mounted at the central portion 120 thereof on the second brake arm mounting axle 106, as shown in FIGS. 1-4 and 6. The force application linkage structure 110 is coupled between a first end portion 124 of the first brake arm 102 and a first end portion 126 of the second brake arm 104. The force application linkage structure 110 has a lever 128 (i.e., a first force transmitting member) pivotably connected at its first end portion 129 to the first end portion 124 of the first brake arm and a strut 130 (i.e., a second force transmitting member) pivotably connected at its first end portion 131 to the first end portion 126 of the second brake arm. The strut 130 is pivotably connected at its second end portion 132 to a central portion 134 of the lever 128. The movement control linkage member 114 is coupled between the second brake arm mounting axle 108 and the lever 128.

The lever 128 and the strut 130 jointly define a brake arm displacement means coupled between the first brake arm 102 and the second brake arm 104. It can be seen that, during the first actuation mode of such a displacement means, the portion of the lever 128 coupled between the strut 130 and the first brake arm 102 and the portion of the strut 130 coupled between the lever 128 and the second brake arm 104 remain under a compressive loading as a result of the manner in which force is applied to the lever 128 at the force application portion 136 of the lever 128 and the manner in which the strut 128, the lever 130, and brake arms 102, 104 are pivotally coupled to each other.

A brake cable housing 133 is engaged with a force application portion 136 of the lever 128 (i.e., a second end portion of the lever 128) and a brake cable 135 is engaged with the second brake arm mounting axle 108 (e.g., via a cable cinching screw 113). Through actuation of a brake lever assembly (not shown) that is connected to the brake cable housing 133 and the brake cable 135 (i.e., relative movement of the brake cable housing 133 toward the second brake arm mounting axle 108), the lever 128 can be selectively pivoted about its first end portion 129 from an at-rest position (shown) to a displaced position (i.e., the force application portion 136 of the lever 128 closer to the strut 130). Displacement of a force application portion 136 of the lever 128 from the at-rest position toward the strut 130 (i.e., a first displacement direction) causes the brake arms 102, 104 to pivot with respect to a respective one of the axles 106, 108 on which each one of the brake arms 102, 104 is pivotably mounted such that a distance between the first end portions 124, 126 of the brake arms 102, 104 increases and, correspondingly, a distance between second end portions 138, 140 of the brake arms 102, 104 decreases. In this regard, a brake pad assembly 142 (i.e., a brake pad 144 mounted in a brake pad holder 146) mounted at the second end portion 138, 140 of each one of the brake arms 102, 104 can come into contact with and exert a stopping force on a rim braking surface of a bicycle wheel located between the second end portions 138, 140 of the brake arms 102, 104. A spring 144 (e.g., a helical coil spring connected between the brake arms 102, 104) biases the brake arms 102, 104 to the position corresponding to the at-rest position. Thus, when the brake lever assembly is acted on for causing relative movement of the brake cable housing 133 toward the second brake arm mounting axle 108, the force application portion 136 of the lever 128 exhibits displacement toward the at-rest position (i.e., a second displacement direction), which causes the brake arms 102, 104 to pivot with respect to a respective one of the brake arm axles 106, 108 on which each one of the brake arms 102, 104 is pivotably mounted such that a distance between the first end portion 124, 126 of the brake arms 102, 104 decreases and, correspondingly, a distance between second end portions 138, 140 of the brake arms 102, 104 increases.

Figure 1:
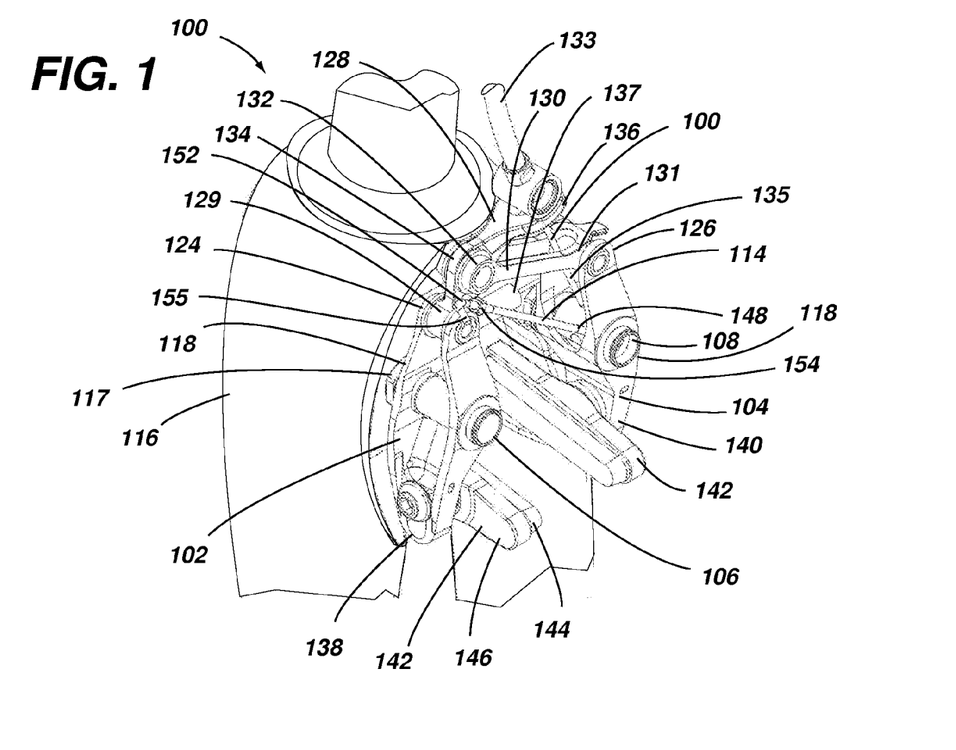
FIG. 1 is a front perspective view of a brake caliper assembly configured in accordance with an embodiment of the present invention mounted on a prior art fork of a bicycle frameset.
Figure 2:
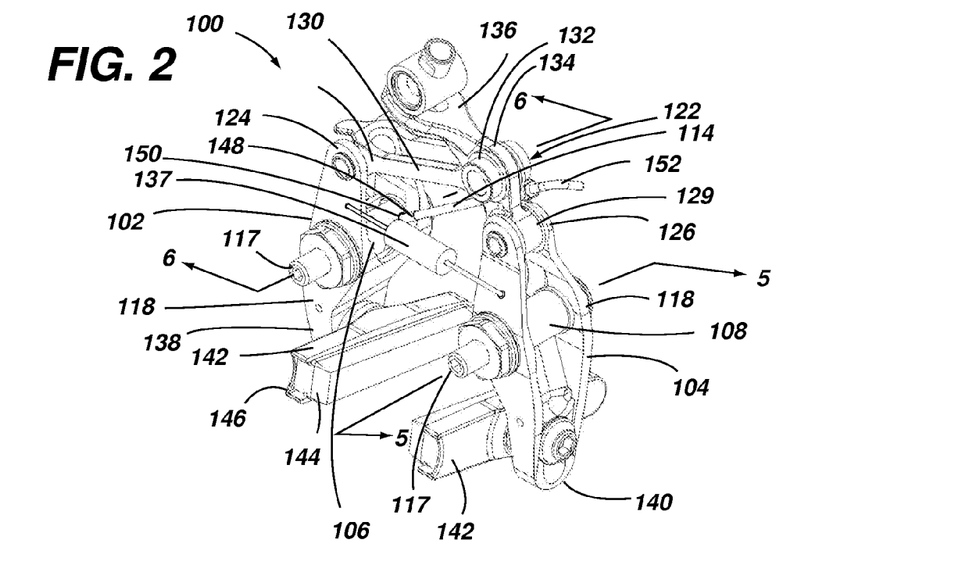
FIG. 2 is a rear perspective view of the brake caliper assembly of FIG. 1.
Figure 4:
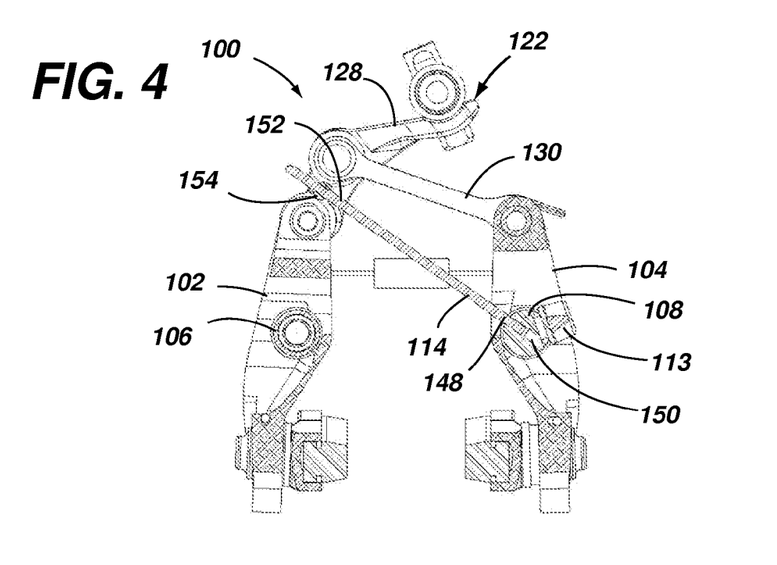
FIG. 4 is a cross-sectional view taken along the line 4-4 in FIG. 3.
Figure 5:
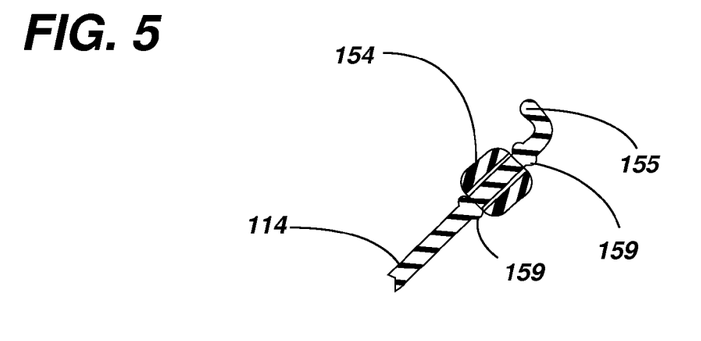
FIG. 5 is a fragmentary cross-sectional view showing attachment of a motion control linkage member and lever of the brake caliper assembly of FIG. 1
Figure 6:
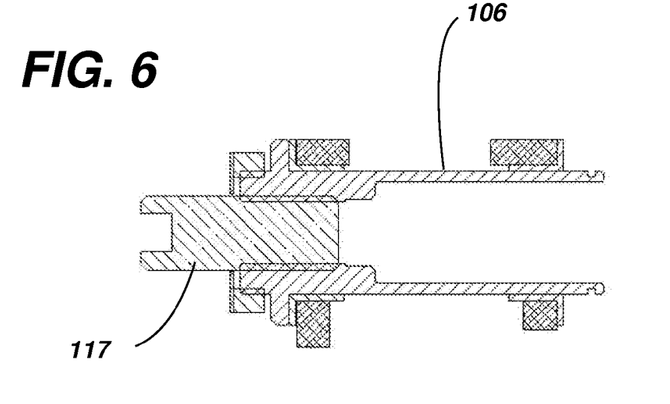
FIG. 6 is a cross-sectional view taken along the line 6-6 in FIG. 2.
Figure 7:
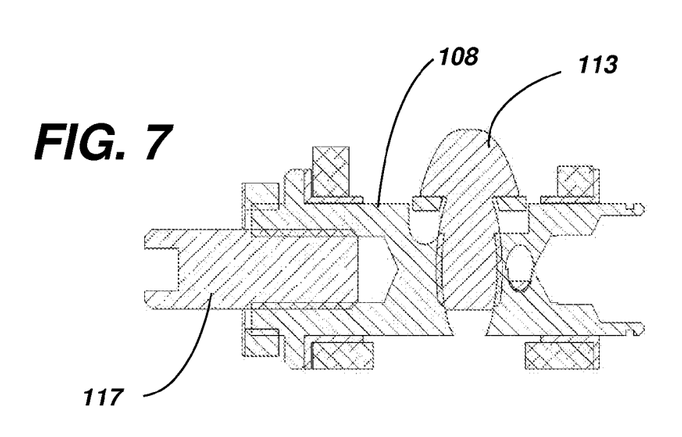
FIG. 7 is a cross-sectional view taken along the line 7-7 in FIG. 2.

As disclosed above and as best shown in FIGS. 1, 2 and 4, the movement control linkage member 114 is coupled between the second brake arm mounting axle 108 and the lever 128. A first end portion 148 of the movement control linkage member 114 is threadedly engaged within a threaded passage 150 of the second brake arm mounting axle 108. As shown in FIG. 5, a second end portion 152 of the movement control linkage member 114 is engaged with a mating engagement structure 154 of the lever 128 in a manner allowing free rotation (i.e., non-threaded engagement) and limiting (e.g., effectively inhibiting) axial translation of the movement control linkage member 114 with respect to the mating engagement structure 154 of the lever 128 (i.e., along a longitudinal axis of the movement control linkage member 114). For example, as shown in FIG. 5, the movement control linkage member 114 can be deformed to create protrusions 159 that enable rotation of the movement control linkage member 114 with respect to the mating engagement structure 154 of the lever 128 while and limit axial translation of the movement control linkage member 114 with respect to the mating engagement structure 154 of the lever 128. Alternatively, features such as for example on or more shoulders and/or one or more lock rings/lock ring grooves can be used for enabling rotation of the movement control linkage member 114 with respect to the mating engagement structure 154 of the lever 128 while limiting axial translation of the movement control linkage member 114 with respect to the mating engagement structure 154 of the lever 128. Embodiments of the present invention are not unnecessarily limited to any particular means for enabling rotation of the movement control linkage member 114 with respect to the mating engagement structure 154 of the lever 128 while and limiting axial translation of the movement control linkage member 114 with respect to the mating engagement structure 154 of the lever 128.

The engagement structure 154 of the lever 128 can pivot about an axis extending substantially or generally parallel to an axes of rotation of the brake arm mounting axles 106, 108. The mating engagement structure 154 of the lever 128 is positioned between the first end portion 129 of the lever 128 and the central portion 134 of the lever 128. The movement control linkage member 114 includes a head portion 155 that can be brought into contact with the mating engagement structure 154 of the lever 128 for limiting longitudinal sliding motion of the movement control linkage member 114 with respect to the mating engagement structure 154 in one direction of translation (i.e., the mating engagement structure 154 moving away from the second brake arm mounting axle 108). Through the threaded engagement of the movement control linkage member 114 with the second brake arm mounting axle 108, an effective length of the movement control linkage member 114 (e.g., distance between the head portion 155 and outside surface of the second brake arm mounting axle 108) is adjustable.

In view of the disclosures made herein, a skilled person will understand that the movement control linkage member 114 is connected at its first end portion 148 to the second brake arm mounting axle 108 in a manner inhibiting longitudinal translation of movement control linkage member with respect to the second brake arm mounting axle and is connected at its second end portion 152 to the lever 128 in a manner allowing longitudinal translation of the movement control linkage member 114 with respect to the lever 128. Such a skilled person will also understand that, in an alternate embodiment (not shown), the movement control linkage member 114 can be connected at its first end portion 148 to the second brake arm mounting axle 108 in a manner allowing longitudinal translation of movement control linkage member with respect to the second brake arm mounting axle and is connected at its second end portion 152 to the lever 128 in a manner inhibiting longitudinal translation of the movement control linkage member 114 with respect to the lever 128.

The movement control linkage member 114 provides the functionality of controlling movement the brake arms relative to each other for a given displacement of the force application linkage structure. In preferred embodiments, coupling of the movement control linkage member 114 between a non-translating component of the brake clipper assembly 100 (e.g., the second brake arm mounting axle 108) and a translating component of the brake arm displacement means (e.g., the lever 128) in combination with an effective length of the movement control linkage member 114 and the location of the mating engagement structure 154 of the lever 128 provides for approximately equal movement of the first brake arm 102 and the second brake arm 104 upon actuation of the brake arm displacement means. The term "equal movement" as used, for example, in equal movement of the brake pad assembly 142 of the first brake arm 102 and the brake pad assembly 142 of the second brake arm 104 means that each brake pad assembly 142 moves an about equivalent distance in the opposite direction toward the rim braking surface of the bicycle wheel. This enables the brake pads 144 of the brake pad assemblies 142 to come in contact with the rim consistently and approximately simultaneously during actuation of the brake caliper assembly 100. In one exemplary example of an approximately equal movement, the relative distance travelled by brake pad assemblies 142 as they move toward the rim is different by less than 5% to 10%. In typical embodiments, the brake pads 144 preferably contact the rim in a relatively symmetrical and coordinated fashion so that a rider can detect no discernable unevenness in the braking force applied to each side of the rim.

As disclosed above, through the threaded engagement of the movement control linkage member 114 with the second brake arm mounting axle 108, an effective length of the movement control linkage member 114 (e.g., distance between the head portion 155 and outside surface of the second brake arm mounting axle 108) is adjustable. By adjusting the effective length of movement control linkage member 114, a distance between the brake pads 144 and the rim can be adjusted. Through such adjustment, as one of the brake arms moves closer to the rim, the other brake arm moves farther away from the rim and visa versa. Therefore, implementing the movement control linkage member 114 in a manner whereby it has an adjustable effective length, the rim can be centered between the two brake pads 144 and such centering maintained during actuation of the brake caliper assembly 100. In this manner, rather than relying on springs that provide balancing spring force or a dual pivot design for centering of the two brake pads 144 in static and dynamic conditions (e.g., such as seen in the prior art brake caliper assemblies), embodiments of the present invention utilize the movement control linkage member 114 to control travel and/or positioning of brake arms 102, 104. Because the movement control linkage member 114 only transmits the loads needed to balance position of the two brake arms 102, 104 and not braking loads, the movement control linkage member 114 can be of a relatively low weight. Therefore, the movement control linkage member 114 enables repeatable, consistent brake performance while reducing weight of the brake caliper assembly 100.

A skilled person will appreciate that a path of motion of the mating engagement structure 154 of the lever 128 is not necessarily a fixed distance from the threaded passage 150 of the second brake arm mounting axle 108. As such, the movement control linkage member 114 and/or its end coupling(s) are configured in a manner that accommodates this non-fixed distance of the mating engagement structure 154 of the lever 128 to the threaded passage 150 of the second brake arm mounting axle 108. For example, the movement control linkage member 114 can be made suitable flexible and/or it can include a pivoting joint (e.g., a spherical joint) at or near its first end portion 148.

Figure 3:
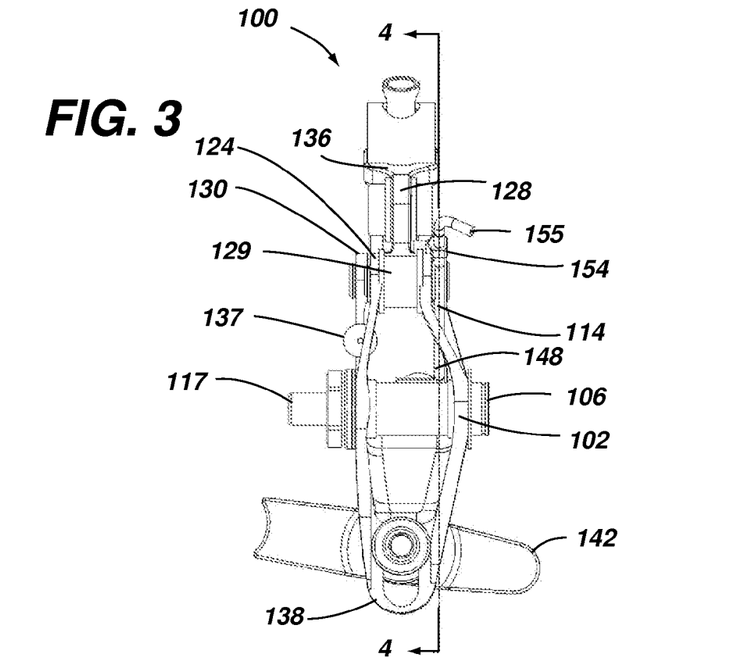
FIG. 3 is a side view of the brake caliper assembly of FIG. 1.
Figure 8:
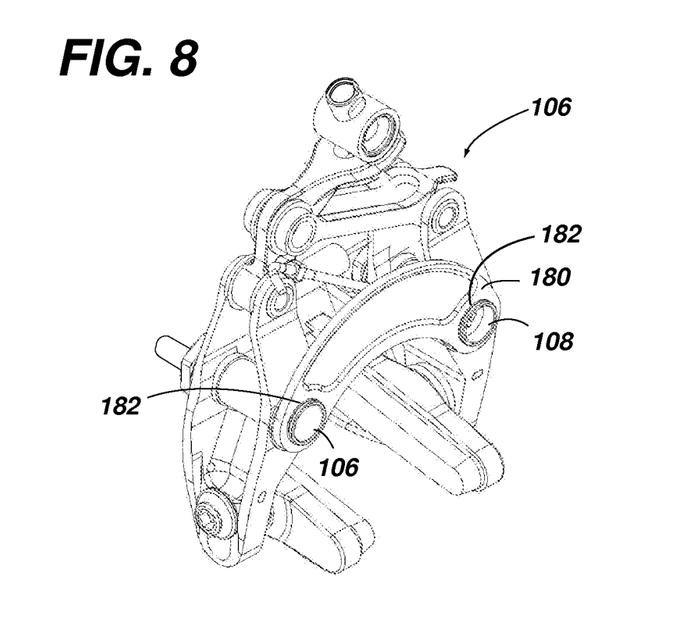
FIG. 8 is a front perspective view showing the brake caliper assembly of FIG. 1 having a bridge plate integral therewith.

Referring now to FIG. 8, the brake caliper assembly 100 of FIGS. 1-3 having a bridge plate 180 integral therewith. As can be seen in FIG. 1, without the bridge plate 180, ends portions of the brake arm mounting axles 106, 108 opposite the respective mounting stud 117 are unsupported with respect to the brake arm support structure 116 of the bicycle frameset. The bridge plate 180 is engaged with such unsupported ends portions of each one of the brake arm mounting axles 106, 108 for providing support thereto via the opposite one of the brake arm mounting axles 106, 108. To this end, the bridge plate 180 has two spaced apart axle receiving apertures 182 each configured for receiving an end portion of a respective one of the brake arm mounting axles 106, 108. This engagement limits unrestricted deflection of the end portion of the brake arm mounting axles 108, 109.

Figure 9:
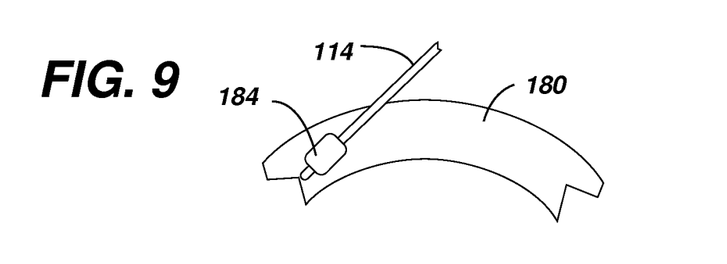
FIG. 9 is a rear view of the bridge plate shown in FIG. 8.

As shown in FIG. 9, the bridge plate 180 can include an engagement structure 184. The engagement structure 184 of the bridge plate 180 provides the same functionality as the engagement structure 154 of the lever 128. Specifically, rather than the first end portion 148 of the movement control linkage member 114 being engaged with the second brake arm mounting axle 108 (as shown in FIGS. 1-4), it can be engaged (e.g., via threaded engagement) with the engagement structure 184 of the bridge plate 180.

The present invention is not to be limited in scope by the embodiments disclosed herein, which are intended as single illustrations of individual aspects of the invention, and any that are functionally equivalent are within the scope of the invention. Various modifications to the models and methods of the invention, in addition to those described herein, will become apparent to those skilled in the art from the foregoing description and teachings, and are similarly intended to fall within the scope of the invention. Such modifications or some embodiments can be practiced without departing from the true scope and spirit of the invention.

What is claimed is:

1. A bicycle brake assembly, comprising:
   a first brake arm having a first end portion, a second end portion, and a central portion between said end portions thereof;
   a second brake arm having a first end portion, a second end portion, and a central portion between said end portions thereof;
   a plurality of axles, wherein the first brake arm is pivotably mounted at the central portion thereof on a first one of said axles and wherein the second brake arm is pivotably mounted at the central portion thereof on a second one of said axles;
   brake arm displacement means having a first force transmitting member thereof connected to the first end portion of the first brake arm and a second force transmitting member thereof connected to the first end portion of the second brake arm, wherein a first actuation mode of said brake arm displacement means causes each one of said brake arms to pivot with respect to a respective one of the axles on which each one of the brake arms is pivotably mounted such that a distance between the first end portion of said brake arms increases and wherein a second actuation mode of said brake arm displacement means causes said brake arms to pivot with respect to a respective one of the axles on which each one of the brake arms is pivotably mounted such that a distance between the first end portion of said brake arms decreases; and
   a movement control linkage member comprising a first end portion and a second end portion, the second end portion coupled to the first one of said force transmitting members of the brake arm displacement means and the first end portion coupled to the second one of said axles for controlling movement of said brake arms relative to each other for a given displacement of the brake arm displacement means.

2. The bicycle brake assembly of claim 1 wherein at least one of a length and a shape of the movement control linkage member and its coupling between the main body and the brake arm displacement means cause approximately equal movement of the first brake arm and the second brake arm for a given displacement of the brake arm displacement means.

3. The bicycle brake assembly of claim 1 wherein the movement control linkage member is engaged at the first end portion thereof with the second one of said axles in a threaded manner and is engaged at the second end portion thereof with the first one of said force transmitting members of the brake arm displacement means in a manner allowing free rotating and limiting unrestricted axial translation of the movement control linkage member with respect to the first one of said force transmitting members of the brake arm displacement means.

4. The bicycle brake assembly of claim 1 wherein:
the first end portion and the second end portion form opposing end portions;
the movement control linkage member is connected between the second one of said axles and the first one of said force transmitting members of the brake arm displacement means through said opposing end portions thereof;
the first one of said force transmitting members of the brake arm displacement means and the second one of said axles are linkage member connecting structures;
the first end portion is connected in a manner inhibiting longitudinal translation thereof with respect to a respective one of the linkage member connecting structures; and
the second end portion is connected in a manner allowing longitudinal translation thereof with respect to a respective one of the linkage member connecting structures.

5. The bicycle brake assembly of claim 1 wherein:
the movement control linkage member is connected at the first end portion thereof to the second one of said axles in a manner inhibiting longitudinal translation of the first end portion of the movement control linkage member with respect to the second one of said axles; and
the movement control linkage member is connected at the second end portion thereof to the brake arm displacement means in a manner allowing longitudinal translation of the second end portion of the movement control linkage member with respect to the first one of said force transmitting members of the brake arm displacement means.

6. The bicycle brake assembly of claim 5 wherein:
the brake arm displacement means includes a plurality of linkages; and
the movement control linkage member is connected to a first one of said linkages.

7. A bicycle brake assembly, comprising:
a first brake arm having a first end portion, a second end portion, and a central portion between said end portions thereof;
a second brake arm having a first end portion, a second end portion, and a central portion between said end portions thereof;
a plurality of axles, wherein the first brake arm is pivotably mounted at the central portion thereof on a first one of said axles and wherein the second brake arm is pivotably mounted at the central portion thereof on a second one of said axles;
a force application linkage structure having a first force transmitting member thereof connected to the first end portion of the first brake arm and a second force transmitting member thereof connected to the first end portion of the second brake arm, wherein displacement of a force application portion of the force application linkage structure in a first displacement direction thereof causes said brake arms to pivot with respect to a respective one of the axles on which each one of the brake arms is pivotably mounted such that a distance between the first end portion of said brake arms increases and wherein displacement of the force application portion in a second displacement direction thereof causes said brake arms to pivot with respect to a respective one of the axles on which each one of the brake arms is pivotably mounted such that a distance between the first end portion of said brake arms decreases; and
a movement control linkage member comprising a first end portion and a second end portion, the second end portion coupled to the first one of said force transmitting members of the force application linkage structure and the first end portion coupled to the second one of said axles for controlling movement of said brake arms relative to each other for a given displacement of the force application linkage structure.

8. The bicycle brake assembly of claim 7 wherein:
the first force transmitting member is a lever;
the second force transmitting member is a strut;
the lever has a first end portion, a second end portion, and a central portion between said end portions thereof;
the lever is pivotably connected at a first end portion thereof to the first end portion of the first brake arm;
the strut is pivotably connected at a first end portion thereof to the first end portion of the second brake arm and pivotably connected at a second end portion thereof to the central portion of the lever; and
the movement control linkage member is connected to the lever.

9. The bicycle brake assembly of claim 8 wherein the movement control linkage member is connected to the lever at a position between the first end portion thereof and the central portion thereof.

10. The bicycle brake assembly of claim 7 wherein the movement control linkage member is engaged at the first end portion thereof with the second one of said axles in a threaded manner and is engaged at the second end portion thereof with the first force transmitting member of the force application linkage structure in a manner allowing free rotating and limiting unrestricted axial translation of the movement control linkage member with respect to the first force transmitting member of the force application linkage structure.

11. The bicycle brake assembly of claim 7 wherein:
the first end portion and the second end portion form opposing end portions;
the movement control linkage member is connected between the second one of said axles and the first force transmitting member of the force application linkage structure through said opposing end portions thereof;
the first force transmitting member of the force application linkage structure and the second one of said axles are linkage member connecting structures;
the first one of said end portions is connected in a manner inhibiting longitudinal translation thereof with respect to a respective one of the linkage member connecting structures; and
the second one of said end portions is connected in a manner allowing longitudinal translation thereof with respect to a respective one of the linkage member connecting structures.

12. The bicycle brake assembly of claim 7 wherein: the movement control linkage member is connected at the first end portion thereof to the second one of said axles in a manner inhibiting longitudinal translation of the first end portion of the movement control linkage member with respect to the second one of said axles; and
the movement control linkage member is connected at the second end portion thereof to the first force transmitting member of the force application linkage structure in a manner allowing longitudinal translation of the second end portion of the movement control linkage member with respect to the first force transmitting member of the force application linkage structure.

13. The bicycle brake assembly of claim 12 wherein:
the first force transmitting member is a lever;
the second force transmitting member is a strut;
the lever has a first end portion, a second end portion, and a central portion between said end portions thereof;
the lever is pivotably connected at a first end portion thereof to the first end portion of the first brake arm;
the strut is pivotably connected at a first end portion thereof to the first end portion of the second brake arm and pivotably connected at a second end portion thereof to the central portion of the lever; and
the movement control linkage member is connected to the lever.

14. The bicycle brake assembly of claim 13 wherein the movement control linkage member is connected to the lever at a position between the first end portion thereof and the central portion thereof.

15. A bicycle brake assembly, comprising:
a first brake arm having a first end portion, a second end portion, and a central portion between said end portions thereof;
a second brake arm having a first end portion, a second end portion, and a central portion between said end portions thereof;
an axle assembly including a plurality of axles and a bridge plate coupled between a first end portion of each one of the axles, wherein the first brake arm is pivotably mounted at the central portion thereof on a first one of said axles and wherein the second brake arm is pivotably mounted at the central portion thereof on a second one of said axles;
a force application linkage structure having a first force transmitting member thereof connected to the first end portion of the first brake arm and a second force transmitting member thereof connected to the first end portion of the second brake arm, wherein displacement of a force application portion of the force application linkage structure in a first displacement direction thereof causes said brake arms to pivot with respect to a respective one of the axles on which each one of the brake arms is pivotably mounted such that a distance between the first end portion of said brake arms increases and wherein displacement of the force application portion in a second displacement direction thereof causes said brake arms to pivot with respect to a respective one of the axles on which each one of the brake arms is pivotably mounted such that a distance between the first end portion of said brake arms decreases; and
a movement control linkage member comprising a first end portion and a second end portion, the second end portion coupled to the first force transmitting member of the force application linkage structure and the first end portion coupled to the axle assembly in a threaded manner for controlling movement of said brake arms relative to each other for a given displacement of the force application linkage structure.

16. The bicycle brake assembly of claim 15 wherein:
the first end portion of the movement control linkage member is connected to one of the bridge plate and the second one of said axles; and
the second end portion of the movement control linkage member is connected to the force application linkage structure.

17. The bicycle brake assembly of claim 15 wherein:
the first force transmitting member of the force application linkage structure is a lever;
the second force transmitting member of the force application linkage structure is a strut;
the lever has a first end portion, a second end portion, and a central portion between said end portions thereof;
the lever is pivotably connected at a first end portion thereof to the first end portion of the first brake arm;
the strut is pivotably connected at a first end portion thereof to the first end portion of the second brake arm and pivotably connected at a second end portion thereof to the central portion of the lever; and
the movement control linkage member is connected to the lever.

18. The bicycle brake assembly of claim 17 wherein:
the first end portion of the movement control linkage member is connected to one of the bridge plate and the second one of said axles; and
the second end portion of the movement control linkage member is connected to the first force transmitting member of the force application linkage structure.

19. The bicycle brake assembly of claim 15 wherein the movement control linkage member is engaged at the first end portion thereof with the axle assembly in the threaded manner and is engaged at the second end portion thereof with the first force transmitting member of the force application linkage structure in a manner allowing free rotating and limiting unrestricted axial translation of the movement control linkage member with respect to the first force transmitting member of the force application linkage structure.

20. The bicycle brake assembly of claim 15 wherein:
the first end portion and the second end portion form opposing end portions;
the movement control linkage member is connected between the axle assembly and the first force transmitting member of the force application linkage structure through said opposing end portions thereof;
the first force transmitting member of the force application linkage structure and the axle assembly are linkage member connecting structures;
the first end portion is connected in a manner inhibiting longitudinal translation thereof with respect to a respective one of the linkage member connecting structures; and
the second end portion is connected in a manner allowing longitudinal translation thereof with respect to a respective one of the linkage member connecting structures.

* * * * *